United States Patent [19]
Rice et al.

[11] Patent Number: 5,775,741
[45] Date of Patent: Jul. 7, 1998

[54] SWIMMING POOL CLEANER SWIVEL ASSEMBLY

[75] Inventors: Chris A. Rice, Boca Raton, Fla.; Graham M. Barton, Escondido, Calif.

[73] Assignee: Baracuda International Corporation, Ft. Lauderdale, Fla.

[21] Appl. No.: 592,197

[22] Filed: Jan. 26, 1996

[51] Int. Cl.⁶ ............................ F16L 27/08; E04H 3/20
[52] U.S. Cl. ..................... 285/272; 285/276; 285/331; 285/319; 15/1.7
[58] Field of Search .......................... 285/272, 275, 285/276, 278, 319, 331; 15/1.7, 246

[56] References Cited

U.S. PATENT DOCUMENTS

| | | | |
|---|---|---|---|
| 3,512,540 | 5/1970 | Hughes | 285/276 |
| 3,872,533 | 3/1975 | Proffit | 15/1.7 |
| 3,967,841 | 7/1976 | Kendrick et al. | 285/276 |
| 4,133,068 | 1/1979 | Hofmann . | |
| 4,208,752 | 6/1980 | Hofmann . | |
| 4,351,077 | 9/1982 | Hofmann . | |
| 4,642,833 | 2/1987 | Stolz et al. . | |
| 4,742,593 | 5/1988 | Kallenbach . | |
| 4,761,848 | 8/1988 | Hofmann . | |
| 4,776,954 | 10/1988 | Brooks | 15/1.7 |
| 4,807,318 | 2/1989 | Kallenbach . | |
| 4,817,996 | 4/1989 | Fouts | 285/276 |
| 5,014,382 | 5/1991 | Kallenbach . | |
| 5,315,728 | 5/1994 | Atkins . | |
| 5,450,645 | 9/1995 | Atkins | 15/1.7 |
| 5,546,982 | 8/1996 | Clork et al. | 137/557 |
| 5,599,328 | 2/1997 | Stevens | 285/276 |

Primary Examiner—Eric K. Nicholson
Attorney, Agent, or Firm—Dean W. Russell; Mitchell G. Weatherly; Kilpatrick Stockton LLP

[57] ABSTRACT

The swivel assembly of the present invention employs a thrust bearing configuration that provides smooth operation under non-axial and axial load conditions. The assembly comprises two opposing bearing surfaces, one on the end of a hose pipe and the other on a bearing race. A cylindrical housing interlocks with the bearing race and includes a flange to keep the bearing surface of the hose pipe in contact with the bearings. Thus, the hose pipe may rotate freely relative to the bearing race and housing. Because only the end of the hose pipe is in contact with the housing or bearings, non-axial bending loads centered in the bearing are resolved through relatively short moment arms thereby reducing friction creating by the non-axial loading condition. A sealing and lubricating thrust washer may be introduced between the flange in the housing and the hose pipe to seal the swivel assembly and to reduce further the friction between the hose pipe and the housing flange and bearing race.

29 Claims, 4 Drawing Sheets

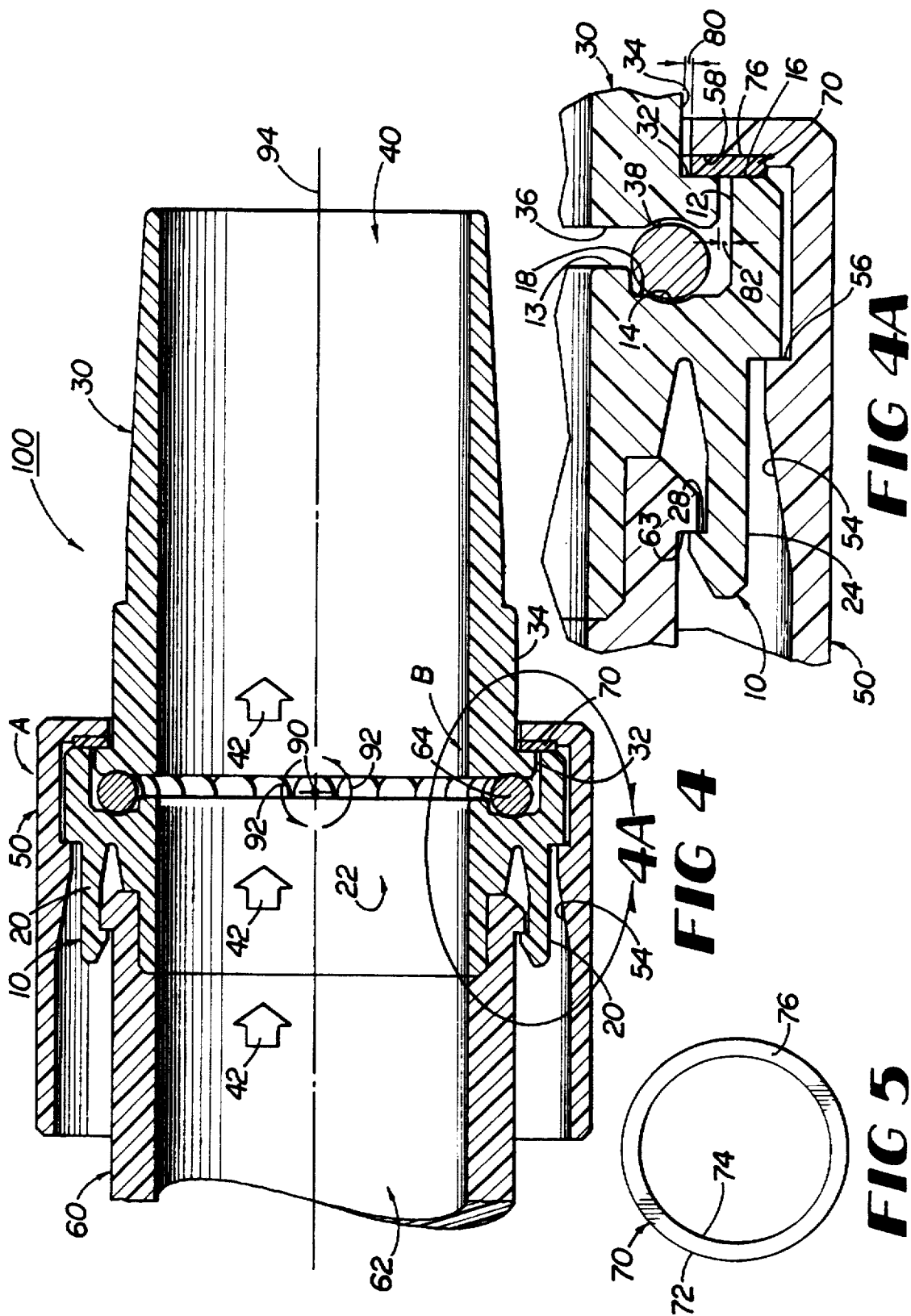

SWIMMING POOL CLEANER SWIVEL ASSEMBLY

BACKGROUND OF THE INVENTION

This invention relates to a component used in swimming pool cleaners of the type disclosed, for example, in U.S. Pat. No. 5,450,645 to Atkins ("Atkins"), which is incorporated in its entirety by this reference. Cleaners such as those disclosed in Atkins move about the surface of a swimming pool automatically. They employ a valve that interrupts the flow through the head of the cleaner in response to the decrease in pressure created by a pump connected, often through a hose, to the valve and the cleaner. Such a valve may comprise a resilient tubular diaphragm, which is typically positioned adjacent the inlet foot of the cleaner.

In operation the valve generates pressure pulses that propel the cleaner head along the pool surface. The cleaner head typically comprises a resilient disc with a central aperture surrounding the inlet of the cleaner. Because the disc is resilient, it acts as a flexible suction cup that loosens dirt and debris from the pool surface so that it may be entrained within the fluid flowing through the inlet of the cleaner to the pump and filter system. The suction under the disc and the resiliency of the disc are sufficient to enable it to climb the side walls within the pool when it encounters the side walls in operation. As it moves about the pool bottom and walls, the cleaner head twists relative to the hose attached to its end. If the cleaner head twists too far, it may cause the hose to kink or prevent the head from twisting farther. Both conditions would impair the movement of the cleaner head about the pool. Therefore, in order to move more effectively about the pool bottom and side walls, a conventional cleaner assembly may include a swivel assembly to allow it to swivel freely in relation to the hose.

The swivel assembly in a conventional cleaner is typically mounted relatively close to the foot of the cleaner and includes a thrust bearing. The thrust bearing reduces the friction in the swivel assembly despite the axial loads imparted by the pressure fluctuations that enable the cleaner head to move about the pool. The swivel assembly of Atkins, for example, is illustrated in FIG. 2 of that patent and comprises outer tube 13 surrounded by collar 19, which have peripheral flanges 20 and 24 respectively. Rings 28 and 29 have complementary openings to accept ball bearings 27. The rings 28 and 29 are clamped together surrounding the ball bearings 27 with clips to form a thrust bearing assembly. The thrust bearing assembly is located between the flanges. Outer body 16, and thus surface engaging disc 17 and inlet foot 18, rigidly engage collar 19 at groove 22. The ball bearings reduce the friction between collar 19 and outer tubular member 13 when the flanges 20 and 24 are forced together. A thrust washer or lubricating ring may be located between stop 21 and collar 19 to reduce friction between collar 19 and outer tubular member 13 when the flanges 20 and 24 are forced apart. Thus, collar 19, outer body 16, and surface engaging disc 17 rotate relative to outer tubular member 13 with relatively little friction when the cleaner assembly is axially loaded and the thrust bearing is axially compressed (i.e., the flanges 20 and 24 are forced together or apart in the direction defined by the longitudinal axes of the outer tubular member 13 and collar 19).

However, thrust bearing assemblies like those disclosed in Atkins may bind when the cleaner assembly encounters non-axial loads (e.g., as the cleaner changes orientation when it moves from the pool bottom to the side wall). Under non-axial load conditions, the outer surface of outer tubular member 13 and the inner surface of collar 19 may come into partial contact. The inner surface of the rings 28 and 29 and the outer surface of the outer tubular member 13 also may come into partial contact. Both types of contact increase the friction in the swivel assembly. Another source of friction in the cleaner head of Atkins is the contact patch between flange 7 and outer body 16. Non-axial loads create significant friction at the flange/outer body interface because the thrust bearing assembly acts as a fulcrum and the length of the outer body 16 from the thrust bearing assembly to the flange as a lever which increases the force with which the flange 7 binds against the outer body 16. As the friction within the swivel assembly and at the flange increases, movement of the cleaner head about the pool surface is impaired.

SUMMARY OF THE INVENTION

Swivel assemblies according to the present invention employ a thrust bearing assembly that minimizes the surface area that may come into contact under non-axial loading conditions. The swivel assembly of the present invention comprises a bearing race having an outer wall, a partial inner wall, and a groove in a bearing surface in which ball bearings run. The bearing race is attached to the proximal end of an extension pipe which is threaded on the distal end. As used in this application, proximal means away from the point at which the cleaner head makes contact with the pool surface and distal means toward that point. The threads on the distal end of the extension pipe mate with the proximal end of a pool cleaner head. The swivel assembly further comprises a hose pipe having a flange extending outwardly from its distal end, a bearing surface with a groove on the distal bearing surface, and a number of friction-reducing radial protrusions distributed around the outer surface of the hose pipe and extending axially near the distal end of the hose pipe. These protrusions also act as grips that ease the removal of a hose from the hose pipe. The hose pipe is positioned so that the outer radial edge of the flange of the hose pipe is located inside the outer wall of the race. Bearings run between the bearing surfaces of the hose pipe and the race. So located, the proximal surface of the flange aligns in the axial direction with the proximal surface of the outer wall of the race. A sealing thrust washer, which may be made of Teflon® or another low friction material, spans the proximal surfaces of the race and flange. A cylindrical swivel housing with a flange extending inward from its proximal end surrounds the hose pipe and the bearing race and engages both effectively to lock the components into a single swivel assembly. The distal surface of the housing flange carries an indentation that mates with the thrust washer to ensure that the washer remains positioned correctly within the assembly.

The clearance between the inner radial edge of the housing flange and the friction-reducing protrusions on the outer surface of the hose pipe is sufficiently small to ensure that the hose pipe and the race remain substantially axially aligned, even under non-axial loading conditions. Because the area of contact between the hose pipe and the swivel housing is small (essentially a few points of contact), friction between the hose pipe and swivel housing is minimized. Moreover, the clearance between the friction-reducing protrusions and the swivel housing is small enough to prevent the outer surface of the hose pipe flange and the inner surface of the outer wall of the race from coming into contact, thus avoiding this potential source of friction under non-axial load conditions.

Swivel assemblies according to the present invention also avoid the leverage-induced friction that exists at the interface between the flange and outer body of Atkins. If a bending moment is applied to the swivel assembly of the present invention, the forces are resolved as compression on one side of the bearing race (carried by the bearings between the bearing surfaces of the hose pipe and the race) and tension on the opposite side of the bearing race (carried by the low-friction thrust washer between the proximal surface of the hose pipe flange and the distal surface of the housing flange). The only non-axial friction occurs at the small points of contact between the friction-reducing protrusions and the inner surface of the housing flange.

All components of the swivel assembly of the present invention may be made of ultraviolet light ("UV") resistant materials (e.g., acetyl co-polymeric material or an acetyl synthetic resin). Some embodiments preferably are formed so that they may be tightly snapped together without separate fasteners to ease assembly and ensure that correct tolerances are maintained.

Accordingly, it is an object of the present invention to provide a swivel assembly for use in an automatic swimming pool cleaner that rotates with very little friction when loaded axially and non-axially.

It is a further object of the present invention to provide a swivel assembly that is easily assembled and constructed of materials that resist deterioration caused by exposure to UV light.

Other objects and advantages of the present invention will become apparent by reference to the accompanying drawings and the following description and claims.

BRIEF DESCRIPTION OF THE DRAWINGS

FIG. 4 is a cross-sectional view of the swivel assembly of the present invention comprising the bearing race shown in FIG. 1A, the hose pipe shown in FIG. 2A, the swivel housing shown in FIG. 3A, and the distal end of the extension pipe shown in a possible physical relationship to each other.

FIG. 4A is a detail view of the mechanical relationship of the components shown in FIG. 4.

FIG. 5 is a plan view of the thrust washer of the present invention.

DETAILED DESCRIPTION OF THE DRAWINGS

Figure 1A:
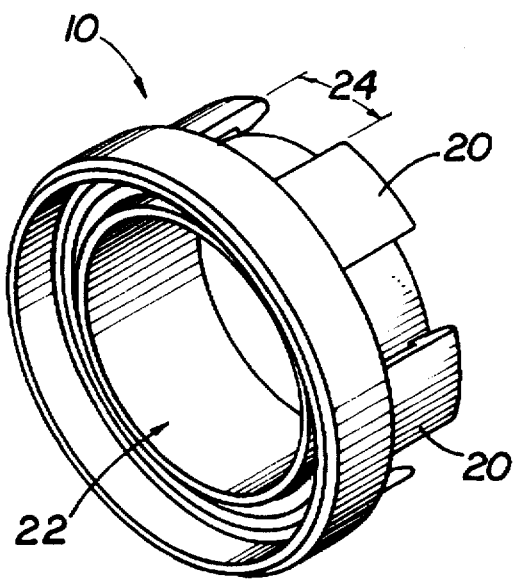
FIG. 1A is a perspective view from the distal end of the bearing race of the present invention.
Figure 1B:
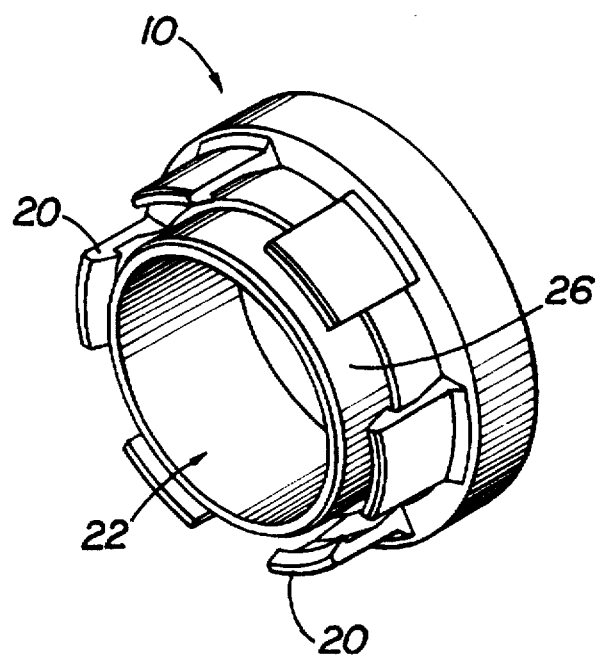
FIG. 1B is a perspective view from the proximal end of the bearing race shown in FIG. 1A.

FIGS. 1A, B, and C collectively illustrate bearing race 10. Race fluid passage 22 is apparent in all three figures. As is best seen in FIG. 1A, interlocking race tab 20 protrudes from the proximal end of bearing race 10. Interlocking race tabs 20 are radially disposed around the perimeter of bearing race 10 and spaced equally to create interlocking race keyways 24. Interlocking race keyways 24 and tabs 20, when connected to complementary structures on an extension pipe 60 (FIGS. 4 and 4A), prevent race 10 from rotating relative to the extension pipe 60. Interlocking race tabs 20 and interlocking race keyways 24 surround race fluid sleeve 26, which defines race fluid passage 22. In some embodiments of the present invention, there are six interlocking race tabs 20. However, those skilled in the art recognize that equivalent structures could accomplish similar results.

Figure 1C:
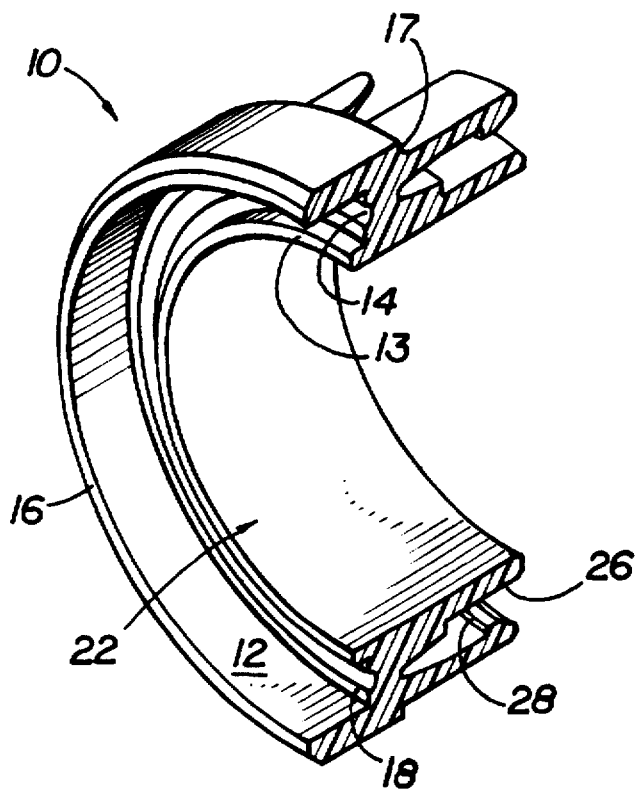
FIG. 1C is a cutaway perspective from above of the distal end of the bearing race shown in FIG. 1A.

FIG. 1C is a cutaway perspective in which more detail of bearing race 10 is visible. Inner wall 13 and outer wall 12 are located on either side of race bearing surface 18, which carries race groove 14. Race fluid sleeve 26 mates with extension pipe 60 as can best be seen in FIG. 4. Interlocking race tab lip 28 engages extension pipe interlocking tab 63 as can best be seen in FIG. 4A.

Figure 2A:
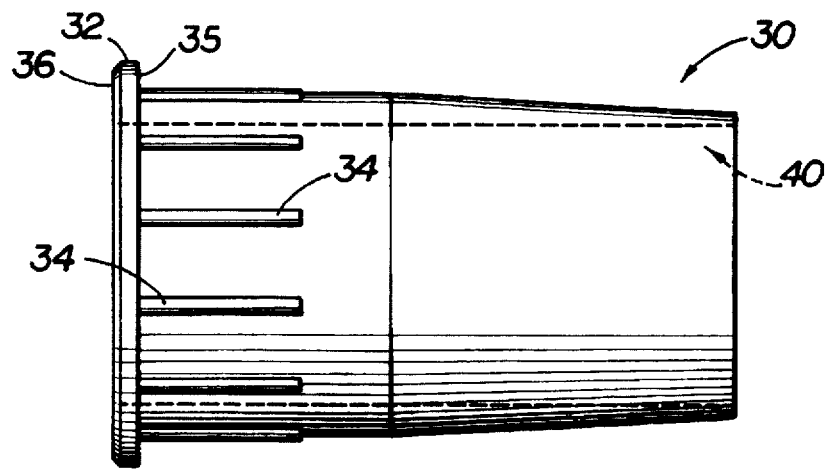
FIG. 2A is a side view of the hose pipe of the present invention.
Figure 2B:
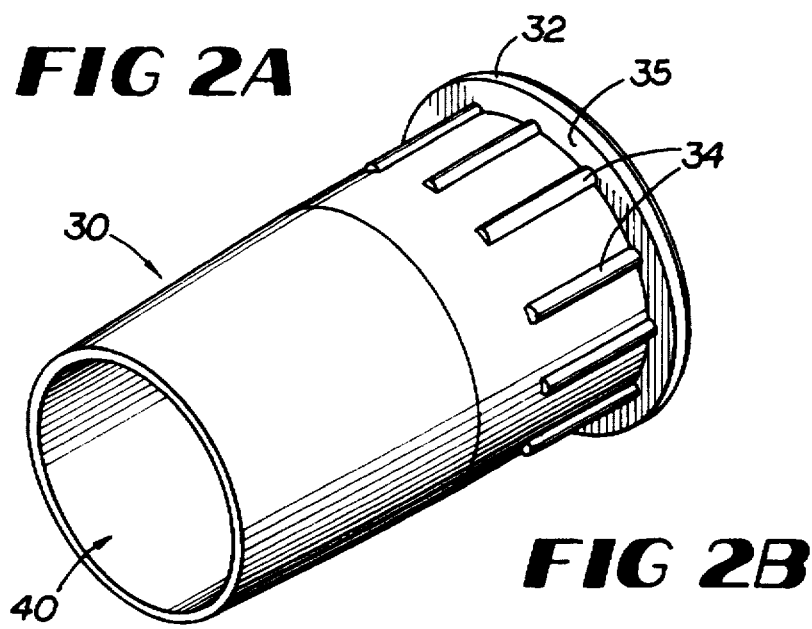
FIG. 2B is a perspective view from above of the distal end of the hose pipe shown in FIG. 2A.
Figure 2C:
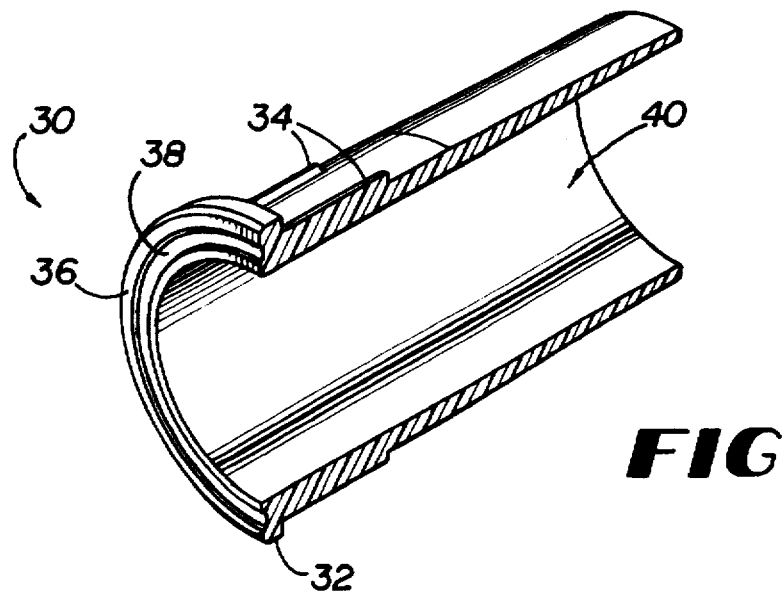
FIG. 2C is a cutaway perspective view from above of the proximal end of the hose pipe shown in FIG. 2A.

The series of FIGS. 2A, B, and C illustrate hose pipe 30. FIG. 2A is a side view of hose pipe 30 in which flange 32 is visible on the distal end. Friction reducing protrusions 34 are radially disposed around the perimeter of hose pipe 30 at the distal end. In some embodiments of the present invention, there are twelve protrusions 34 equally spaced around the perimeter of hose pipe 30. FIG. 2B is a perspective view from the proximal end of hose pipe 30 in which the shape of protrusions 34 is more easily seen. Protrusions 34 extend on the outer surface of hose pipe 30 from the distal surface 35 of flange 32 partially toward the proximal end. FIG. 2C is a perspective view from the distal end of hose pipe 30 in which hose pipe bearing surface 36 and hose pipe groove 38 are clearly visible.

Figure 3A:
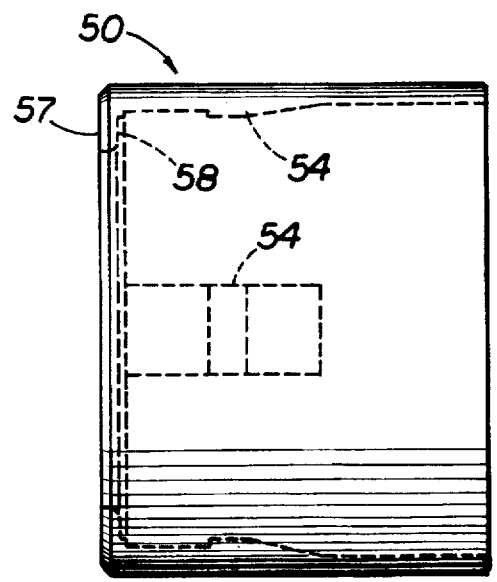
FIG. 3A is a side view of the swivel housing of the present invention.
Figure 3C:
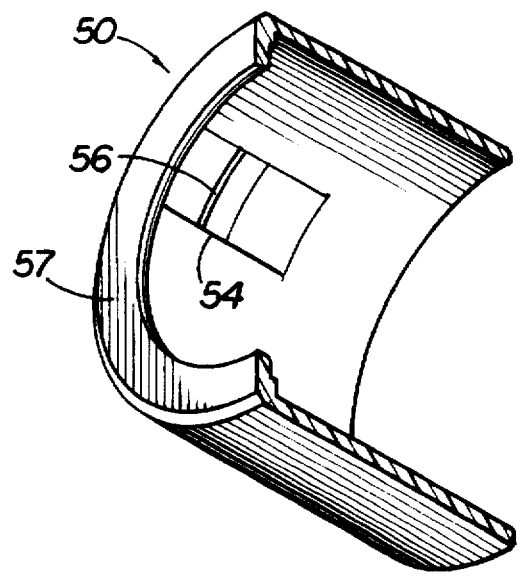
FIG. 3C is a cutaway perspective view from below of the distal end of the swivel housing shown in FIG. 3A.
Figure 3B:
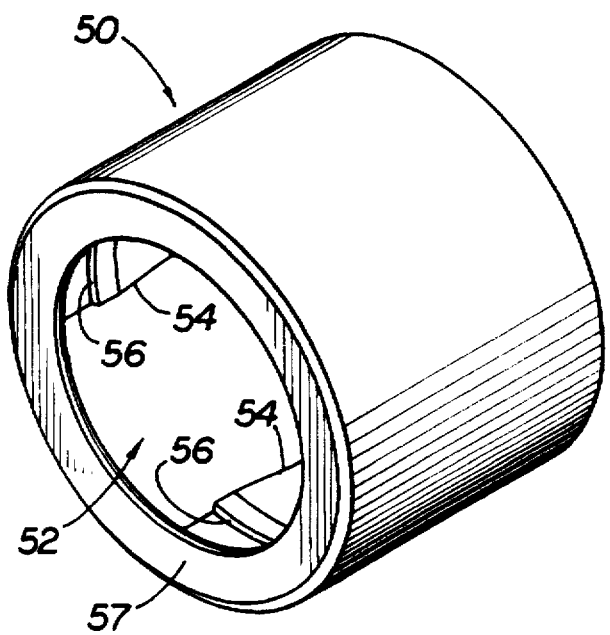
FIG. 3B is a perspective view from above of the distal end of the swivel housing shown in FIG. 3A.
Figure 3D:
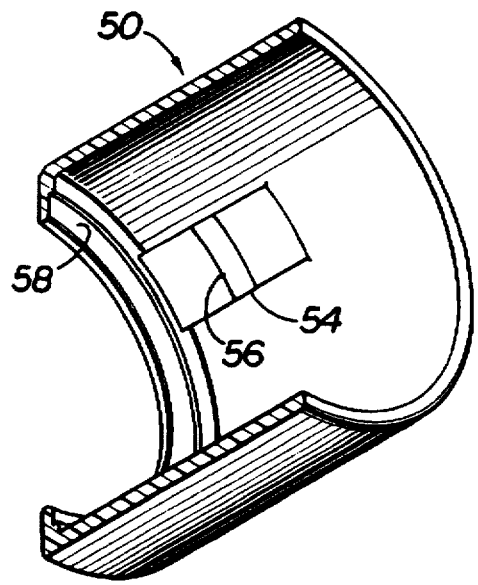
FIG. 3D is a cutaway perspective from below of the proximal end of the swivel housing shown in FIG. 3A.

FIGS. 3A, B, C, and D illustrate swivel housing 50. FIG. 3A is a side view of swivel housing 50 in which swivel housing tab 54 and thrust washer detent 58 are clearly visible. Swivel housing locking surfaces 56 are visible in FIGS. 3B and 3C. It can also be seen in FIGS. 3B and 3C that more than one swivel housing tab 54 is located on the inner surface of swivel housing 50. In at least one embodiment of the present invention, four such swivel housing tabs 54 are radially disposed and equally spaced around the inner surface of swivel housing 50. Swivel housing opening 52 is best seen in FIG. 3B and is the opening through which swivel housing 50 is mounted onto the swivel assembly of the present invention. Swivel housing flange 57 can be seen in FIG. 3C to extend inwardly from the proximal end of swivel housing 50. Thrust washer detent 58 can also be seen easily in FIG. 3D.

Bearing race 10, hose pipe 30, extension pipe 60, and swivel housing 50 can be seen in their assembled relationship in FIG. 4, which is a cross-sectional view in which swivel assembly 100 is cut on a plane that intersects the longitudinal axis of all the major components of the swivel assembly 100. The major components of swivel assembly 100 may be assembled in the following manner. Race fluid sleeve 26 of bearing race 10 is inserted into the proximal end of extension pipe 60 and pressed into place until interlocking race tab lip 28 engages extension pipe interlocking tab 63. Extension pipe 60 has protrusions (not shown) which correspond to interlocking race keyways 24 of bearing race 10. Once bearing race 10 and extension pipe 60 are permanently interlocked as described above, their inner surfaces form substantially continuous passages 22 and 62 for fluid flow.

Ball bearings 64, which are four millimeters in diameter in some embodiments of the present invention, are placed within race groove 14 in race bearing surface 18. Typically, enough ball bearings 64 are placed within race 10 to substantially fill race 10. Once all ball bearings 64 are in place within race groove 14, hose pipe 30 can be inserted into the proximal end of bearing race 10 so that hose pipe groove 38 in hose pipe bearing surface 36 also engages ball bearings 64. Once hose pipe 30 is positioned on ball bearings 64 as described, the proximal surface 35 of hose pipe 30 and the proximal outer wall of bearing race 10 form a flat surface. Thrust washer 70 with inner diameter 74 and outer diameter 72 and thrust surface 76 is positioned on the continuous surface formed by proximal surface 35 of hose pipe 30 and proximal outer wall 16 of bearing race 10. Thrust washer 70 can be made of any suitable low-friction material that is flexible enough to seal clearance 82 as described below (e.g., Teflon®).

In order to lock hose pipe 30 in its position riding atop bearings 64, swivel housing 50 is slipped over the proximal end of hose pipe 30 and pressed onto the proximal end of bearing race 10 until all swivel housing locking surfaces 56 of swivel housing tabs 54 (four of which are shown in the embodiment of FIGS. 3A, 3B, 3C, and 3D) engage distal outer wall 17 (as is best seen in FIG. 4A). Also seen in FIG. 4A is the position of thrust washer 70 within thrust washer detent 58 in swivel housing 50. Detent 58 prevents thrust washer 70 from shifting within swivel assembly 100 during the operation of the pool cleaner.

When fully assembled, swivel assembly 100 forms a virtually continuous fluid passageway comprising extension pipe fluid passage 62, race fluid passage 22, and hose pipe fluid passage 40. In operation, fluid flows in the direction defined by arrows 42. The only discontinuity in the fluid passageway through swivel assembly 100 is found at the interface between bearing race 10 and hose pipe 30. At this interface, an opening exists to expose ball bearings 64. When fluid flows in direction 42 through swivel assembly 100, fluid in the fluid passageway is lower than the pressure outside the passageway. Thus, the pressure at the opening near ball bearings 64 and hose pipe/race clearance 82 is lower than outside the swivel assembly. This reduction in pressure has the effect of drawing thrust washer 70 in the distal direction toward ball bearings 64. Thrust washer 70 provides an effective seal for hose pipe/clearance 82 so that in operation the walls of the fluid passageway through swivel assembly 100 is pressure tight.

When configured as described above, swivel assembly 100 allows for very low-friction rotation of hose pipe 30 relative to bearing race 10 and extension pipe 60. This low friction interface is virtually insensitive to thrust loads in the axial direction or loads imparted by bending moments (e.g., bending moment 92 which is centered at point 90). Axial loads are those generated primarily by the pressure fluctuations within the cleaner head that is attached to swivel assembly 100 and that propels the cleaner head along the pool surface. The non-axial bending moment 92 is generated when the cleaner head encounters a transition from the pool bottom to a side wall for example. The clearance 80 is sufficiently small to prevent hose pipe 30 from becoming axially misaligned with extension pipe 60 and bearing race 10. When a bending moment 92 is applied to swivel assembly 100, friction-reducing protrusions 34 contact the inner surface of swivel housing flange 57 and prevent hose pipe 30 from substantially deflecting from the longitudinal axis 94 of swivel assembly 100. Therefore bending moment 92 is resolved in swivel assembly 100 as compression on the ball bearings on the side labeled A of the swivel assembly 100 and compression of thrust washer 70 on the side labeled B of swivel assembly 100. Because ball bearings 64 on side A and thrust washer 70 on side B both provide low friction interfaces, hose pipe 30 swivels in relation to bearing race 10 and extension pipe 60 with relative ease despite a non-axial loading condition. The clearance 80 between protrusions 34 and the inner surface of flange 57 of swivel housing 50 is also sufficiently small to prevent the outer radial surface of flange 32 of hose pipe 30 from contacting the inner surface of outer wall 12 of bearing race 10 (i.e., clearance 82 is always present), thereby avoiding another contact area that could lead to friction which would prevent hose pipe 30 from swiveling relative to bearing race 10 and extension pipe 60.

The superior resistance of swivel assembly 100 to bending moment loads 92 is also achieved because swivel housing 50, bearing race 10, and extension pipe 60 are rigidly attached to each other once assembled. Hose pipe 30 is contained within this rigid assembly but only contacts the assembly at ball bearings 64 and on thrust washer 70, both of which are low friction surfaces. Because these contact points are close together, bending moment 92 is not amplified by a component of swivel assembly 100 acting as a relatively long lever (as occurs with the length of Atkins' outer body 16 from the thrust bearing assembly to Atkins' flange 7 in which this length acts as a lever with the fulcrum located at the thrust bearing assembly to increase the force with which the flange 7 binds against the outer body 16). Purely axial loads (i.e., loads in the direction defined by longitudinal axis 94) are borne very effectively by swivel assembly 100 because ball bearings 64 and thrust washer 70 provide low friction surfaces, and only small portions of some of protrusions 34 are ever forced against the inner wall of swivel housing flange 57. Thus, under all conditions encountered by a pool cleaner head which is attached to swivel assembly 100, swivel assembly 100 provides a low-friction means for hose pipe 30 to swivel relative to extension pipe 60.

Extension pipe 60, on its distal end (not shown) in one embodiment, carries threads which engage with the pool cleaner head (also not shown). A flexible hose (not shown) is attached to the proximal end of hose pipe 30 and communicates with a pump that drives the automatic swimming pool cleaner. Without the low friction interface between hose pipe 30 and extension pipe 60 that is provided by swivel assembly 100, the flexible hose attached to hose pipe 30 may become twisted and impair the ability of the cleaner head to negotiate transitions in the pool surface. By contrast, the low friction interface between hose pipe 30 and extension pipe 60 of the present invention allows hose pipe 30 to swivel relative to extension pipe 60 with very little restriction.

The preceding description and drawings of the present invention are provided for purposes of explanation and illustration. It will be apparent to those skilled in the relevant art that modifications and changes may be made to the invention as described without departing from its scope and spirit.

We claim:

1. A swivel assembly for use in an automatic swimming pool cleaner comprising:

a. a longitudinal axis defining an axial direction;

b. a bearing race that is substantially symmetrical around the longitudinal axis and adapted to be connected in fluid communication with a cleaner head of the automatic swimming pool cleaner, which bearing race comprises:

i. an inner wall defining a first fluid passage, ii. an outer wall having a retaining surface, and
iii. a race bearing surface inside the outer wall,
c. a hose pipe that is substantially symmetrical around the longitudinal axis and adapted to be connected to a hose that is in fluid communication with a pump, which hose pipe comprises:
   i. a tubular section defining a second fluid passage that substantially aligns with the first fluid passage,
   ii. a pipe flange on the distal end of the tubular section and extending radially outward, which pipe flange has a proximal surface and a distal surface, and
   iii. a pipe bearing surface located on the distal surface of the pipe flange;
d. a plurality of ball bearings that run between the race bearing surface and the pipe bearing surface; and
e. a swivel housing that is substantially symmetrical around the longitudinal axis comprising
   i. a swivel housing locking surface that engages the retaining surface and
   ii. a housing flange located on the proximal end of the swivel housing and extending radially inward to define a hose pipe aperture, which housing flange has a housing flange distal surface in which (A) the swivel housing is in locked engagement with the bearing race, (B) the hose pipe aperture closely surrounds the distal end of the hose pipe at a location just proximal to the pipe flange, and (C) the housing flange distal surface is immediately adjacent the proximal surface of the pipe flange whereby the hose pipe freely rotates in relation to the bearing race when the swivel assembly is exposed to forces aligned with the axial direction and forces not aligned with the axial direction.

2. A swivel assembly according to claim 1 in which the hose pipe further comprises a plurality of hose pipe protrusions extending radially from the outer surface of the tubular section of the hose pipe.

3. A swivel assembly according to claim 1 in which the inner wall extends proximally past the bearing race surface.

4. A swivel assembly according to claim 1 in which the hose pipe, bearing race, and swivel housing are made of acetyl co-polymers.

5. A swivel assembly according to claim 1 further comprising a first groove in the race bearing surface and a second groove in the pipe bearing surface.

6. A swivel assembly according to claim 1 further comprising a thrust washer positioned between the proximal surface of the pipe flange and the housing flange distal surface.

7. A swivel assembly according to claim 6 further comprising a detent in the housing flange distal surface for positively locating the thrust washer within the swivel assembly.

8. A swivel assembly for use in an automatic swimming pool cleaner comprising:
a. a longitudinal axis defining an axial direction;
b. a bearing race adapted to be connected in fluid communication with a cleaner head of the automatic swimming pool cleaner, which bearing race comprises:
   i. an inner wall defining a first fluid passage,
   ii. an outer wall having a retaining surface, and
   iii. a race bearing surface inside the outer wall,
c. a hose pipe adapted to be connected to a hose that is in fluid communication with a pump, which hose pipe comprises:
   i. a tubular section defining a second fluid passage that substantially aligns with the first fluid passage and
   ii. a pipe flange on the distal end of the tubular section and extending radially outward, which pipe flange has a distal surface defining a pipe bearing surface and a proximal surface;
d. a plurality of ball bearings that run between the race bearing surface and the pipe bearing surface; and
e. a swivel housing surrounding the hose pipe and bearing race comprising
   i. a means for connecting the swivel housing to the race bearing and
   ii. a housing flange extending radially inward to define a hose pipe aperture whereby the hose pipe freely rotates in relation to the bearing race when the swivel assembly is exposed to forces aligned with the axial direction and forces not aligned with the axial direction.

9. A swivel assembly according to claim 8 in which the hose pipe further comprises a plurality of hose pipe protrusions extending radially from the outer surface of the tubular section of the hose pipe.

10. A swivel assembly according to claim 8 in which the inner wall extends proximally past the bearing race surface.

11. A swivel assembly according to claim 8 in which the hose pipe, bearing race, and swivel housing are made of acetyl co-polymers.

12. A swivel assembly according to claim 8 further comprising a first groove in the race bearing surface and a second groove in the pipe bearing surface.

13. A swivel assembly according to claim 8 further comprising a thrust washer positioned between the proximal surface of the pipe flange and the housing flange distal surface.

14. A swivel assembly according to claim 13 further comprising a detent in the housing flange distal surface for positively locating the thrust washer within the swivel assembly.

15. A swivel assembly for use in an automatic swimming pool cleaner, comprising:
a. a longitudinal axis defining an axial direction;
b. a bearing race that is substantially symmetrical around the longitudinal axis and adapted to be connected in fluid communication with a cleaner head of the automatic swimming pool cleaner, which bearing race comprises:
   i. an inner wall defining a first fluid passage,
   ii. an outer wall having a retaining surface, and
   iii. a race bearing surface inside the outer wall,
c. a hose pipe that is substantially symmetrical around the longitudinal axis and adapted to be connected to a hose that is in fluid communication with a pump, which hose pipe comprises:
   i. a tubular section defining a second fluid passage that substantially aligns with the first fluid passage,
   ii. a pipe flange on the distal end of the tubular section and extending radially outward, which pipe flange has a proximal surface and a distal surface,
   iii. a pipe bearing surface located on the distal surface of the pipe flange, and
   iv. a plurality of hose pipe protrusions extending radially from the outer surface of the tubular section of the hose pipe;
d. a plurality of ball bearings that run between the race bearing surface and the pipe bearing surface; and
e. a swivel housing that is substantially symmetrical around the longitudinal axis comprising
   i. a swivel housing locking surface that engages the retaining surface and ii. a housing flange located on the proximal end of the swivel housing and extending radially inward to define a hose pipe aperture, which housing flange has a housing flange distal surface in which (A) the swivel housing is in locked engagement with the bearing race, (B) the hose pipe aperture closely surrounds the distal end of the hose pipe at a location just proximal to the pipe flange, and (C) the housing flange distal surface is immediately adjacent the proximal surface of the pipe flange whereby the hose pipe freely rotates in relation to the bearing race when the swivel assembly is exposed to forces aligned with the axial direction and forces not aligned with the axial direction.

16. A swivel assembly according to claim 15 further comprising a thrust washer positioned between the proximal surface of the pipe flange and the housing flange distal surface.

17. A swivel assembly according to claim 16 further comprising a detent in the housing flange distal surface for positively locating the thrust washer within the swivel assembly.

18. A swivel assembly for use in an automatic swimming pool cleaner, comprising:
   a. a longitudinal axis defining an axial direction;
   b. a bearing race that is substantially symmetrical around the longitudinal axis and adapted to be connected in fluid communication with a cleaner head of the automatic swimming pool cleaner, which bearing race comprises:
      i. an inner wall defining a first fluid passage,
      ii. an outer wall having a retaining surface, and
      iii. a race bearing surface inside the outer wall.
   c. a hose pipe that is substantially symmetrical around the longitudinal axis and adapted to be connected to a hose that is in fluid communication with a pump, which hose pipe comprises:
      i. a tubular section defining a second fluid passage that substantially aligns with the first fluid passage,
      ii. a pipe flange on the distal end of the tubular section and extending radially outward, which pipe flange has a proximal surface and a distal surface, and
      iii. a pipe bearing surface located on the distal surface of the pipe flange,
   d. a plurality of ball bearings that run between the race bearing surface and the pipe bearing surface;
   e. a swivel housing that is substantially symmetrical around the longitudinal axis comprising
      i. a swivel housing locking surface that engages the retaining surface and
      ii. a housing flange located on the proximal end of the swivel housing and extending radially inward to define a hose pipe aperture, which housing flange has a housing flange distal surface; and
   f. a thrust washer positively located between the proximal surface of the pipe flange and the housing flange distal surface within a detent in the housing flange distal surface in which (A) the swivel housing is in locked engagement with the bearing race, (B) the hose pipe aperture closely surrounds the distal end of the hose pipe at a location just proximal to the pipe flange, and (C) the housing flange distal surface is immediately adjacent the proximal surface of the pipe flange whereby the hose pipe freely rotates in relation to the bearing race when the swivel assembly is exposed to forces aligned with the axial direction and forces not aligned with the axial direction.

19. A swivel assembly according to claim 18 further comprising a plurality of hose pipe protrusions extending radially from the outer surface of the tubular section of the hose pipe.

20. A swivel assembly for use in an automatic swimming pool cleaner, comprising:
   a. a longitudinal axis defining an axial direction;
   b. a bearing race adapted to be connected in fluid communication with a cleaner head of the automatic swimming pool cleaner, which bearing race comprises:
      i. an inner wall defining a first fluid passage,
      ii. an outer wall having a retaining surface, and
      iii. a race bearing surface inside the outer wall.
   c. a hose pipe adapted to be connected to a hose that is in fluid communication with a pump, which hose pipe comprises:
      i. a tubular section defining a second fluid passage that substantially aligns with the first fluid passage,
      ii. a pipe flange on the distal end of the tubular section and extending radially outward, which pipe flange has a distal surface defining a pipe bearing surface and a proximal surface, and
      iii. a plurality of hose pipe protrusions extending radially from the outer surface of the tubular section of the hose pipe;
   d. a plurality of ball bearings that run between the race bearing surface and the pipe bearing surface; and
   e. a swivel housing surrounding the hose pipe and bearing race comprising
      i. a means for connecting the swivel housing to the race bearing and
      ii. a housing flange extending radially inward to define a hose pipe aperture whereby the hose pipe freely rotates in relation to the bearing race when the swivel assembly is exposed to forces aligned with the axial direction and forces not aligned with the axial direction.

21. A swivel assembly according to claim 20 further comprising a thrust washer positioned between the proximal surface of the pipe flange and the housing flange distal surface.

22. A swivel assembly according to claim 21 further comprising a detent in the housing flange distal surface for positively locating the thrust washer within the swivel assembly.

23. A swivel assembly for use in an automatic swimming pool cleaner, comprising:
   a. a longitudinal axis defining an axial direction;
   b. a bearing race adapted to be connected in fluid communication with a cleaner head of the automatic swimming pool cleaner, which bearing race comprises:
      i. an inner wall defining a first fluid passage,
      ii. an outer wall having a retaining surface, and
      iii. a race bearing surface inside the outer wall.
   c. a hose pipe adapted to be connected to a hose that is in fluid communication with a pump, which hose pipe comprises:
      i. a tubular section defining a second fluid passage that substantially aligns with the first fluid passage and
      ii. a pipe flange on the distal end of the tubular section and extending radially outward, which pipe flange has a distal surface defining a pipe bearing surface and a proximal surface;
   d. a plurality of ball bearings that run between the race bearing surface and the pipe bearing surface; and
   e. a swivel housing surrounding the hose pipe and bearing race comprising i. a means for connecting the swivel housing to the race bearing and ii. a housing flange located on the proximal end of the swivel housing and extending radially inward to define a hose pipe aperture, which housing flange has a housing flange distal surface; and f. a thrust washer positively located between the proximal surface of the pipe flange and the housing flange distal surface within a detent in the housing flange distal surface whereby the hose pipe freely rotates in relation to the bearing race when the swivel assembly is exposed to forces aligned with the axial direction and forces not aligned with the axial direction.

24. A swivel assembly according to claim 23 further comprising a plurality of hose pipe protrusions extending radially from the outer surface of the tubular section of the hose pipe.

25. A swivel assembly for use in an automatic swimming pool cleaner, comprising:

a. a longitudinal axis defining an axial direction;

b. a cleaner connector adapted to be connected in fluid communication with a cleaner head of the automatic swimming pool cleaner, which cleaner connector comprises:

i. an inner wall defining a first fluid passage and ii. a connector flange adjacent the proximal end of the cleaner connector and extending radially outward, which connector flange defines a proximal surface;

c. a hose pipe adapted to be connected to a hose that is in fluid communication with a pump, which hose pipe comprises:

i. a tubular section defining a second fluid passage that substantially aligns with the first fluid passage, ii. a pipe flange adjacent the distal end of the tubular section and extending radially outward, which pipe flange has a distal surface and a proximal surface, and iii. a plurality of hose pipe protrusions extending radially from the outer surface of the tubular section of the hose pipe;

d. a swivel housing surrounding the hose pipe and cleaner connector comprising i. a means for connecting the swivel housing to the cleaner connector and ii. a housing flange extending radially inward to define a distal surface and a hose pipe aperture;

e. a first thrust bearing positioned between the proximal surface of the connector flange and the distal surface of the pipe flange; and f. a second thrust bearing positioned between the proximal surface of the pipe flange and the distal surface of the housing flange whereby the hose pipe freely rotates in relation to the cleaner connector when the swivel assembly is exposed to forces aligned with the axial direction and forces not aligned with the axial direction.

26. A swivel assembly according to claim 20 in which the second thrust bearing is a thrust washer.

27. A swivel assembly according to claim 21 further comprising a detent in the housing flange distal surface for positively locating the thrust washer within the swivel assembly.

28. A swivel assembly for use in an automatic swimming pool cleaner, comprising:

a. a longitudinal axis defining an axial direction;

b. a cleaner connector adapted to be connected in fluid communication with a cleaner head of the automatic swimming pool cleaner, which cleaner connector comprises:

i. an inner wall defining a first fluid passage and ii. a connector flange adjacent the proximal end of the cleaner connector and extending radially outward, which connector flange defines a proximal surface;

c. a hose pipe adapted to be connected to a hose that is in fluid communication with a pump, which hose pipe comprises:

i. a tubular section defining a second fluid passage that substantially aligns with the first fluid passage and ii. a pipe flange adjacent the distal end of the tubular section and extending radially outward, which pipe flange has a distal surface and a proximal surface;

d. a swivel housing surrounding the hose pipe and cleaner connector comprising i. a means for connecting the swivel housing to the cleaner connector and ii. a housing flange extending radially inward to define a distal surface having a detent and a hose pipe aperture;

e. a first thrust bearing positioned between the proximal surface of the connector flange and the distal surface of the pipe flange; and f. a thrust washer positively located within the detent in the distal surface of the housing flange between the proximal surface of the pipe flange and the distal surface of the housing flange whereby the hose pipe freely rotates in relation to the cleaner connector when the swivel assembly is exposed to forces aligned with the axial direction and forces not aligned with the axial direction.

29. A swivel assembly according to claim 23 further comprising a plurality of hose pipe protrusions extending radially from the outer surface of the tubular section of the hose pipe.

* * * * *